United States Patent
He et al.

(10) Patent No.: US 8,907,960 B2
(45) Date of Patent: Dec. 9, 2014

(54) COMPUTER, MONITOR AND COMPUTER DISPLAY METHOD

(75) Inventors: Zhiqiang He, Beijing (CN); Haibin Ke, Beijing (CN); Zhongqing Li, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 310 days.

(21) Appl. No.: 13/518,934

(22) PCT Filed: Dec. 15, 2010

(86) PCT No.: PCT/CN2010/079809
§ 371 (c)(1),
(2), (4) Date: Sep. 5, 2012

(87) PCT Pub. No.: WO2011/076071
PCT Pub. Date: Jun. 30, 2011

(65) Prior Publication Data
US 2013/0093777 A1    Apr. 18, 2013

(30) Foreign Application Priority Data
Dec. 23, 2009   (CN) .......................... 2009 1 0243835

(51) Int. Cl.
G06T 15/00    (2011.01)
G06T 1/20     (2006.01)
G06F 1/32     (2006.01)

(52) U.S. Cl.
CPC ............... *G06T 1/20* (2013.01); *G06F 1/3265* (2013.01); *Y02B 60/32* (2013.01); *Y02B 60/1242* (2013.01)
USPC .......................................... 345/522; 713/320

(58) Field of Classification Search
CPC ................................. G06F 1/3202; G06F 1/32
USPC ........................................... 345/522; 713/320
See application file for complete search history.

(56) References Cited

U.S. PATENT DOCUMENTS 5,784,628 A * 7/1998 Reneris ......................... 713/300
(Continued)

FOREIGN PATENT DOCUMENTS

| CN | 1286428 A | 3/2001 |
|----|-----------|--------|
| CN | 2660584 Y | 12/2004 |

(Continued)

OTHER PUBLICATIONS

PCT/CN2010/079809 International Preliminary Report on Patentability dated Jun. 26, 2012 (5 pages).
International Search Report for PCT/CN2010/079809, dated Mar. 24, 2011, 3 pages.

*Primary Examiner* — Maurice L McDowell, Jr.
(74) *Attorney, Agent, or Firm* — Brinks Gilson & Lione; G. Peter Nichols

(57) ABSTRACT

A computer, monitor and a display method of the computer are provided. The computer includes a display card with a graphics processing unit (GPU) and a display memory used to receive the data to be displayed, process the data to be displayed and output the processed data to be displayed on the monitor; a power management module is used to manage the power supply status of the GPU and the display memory; a central processing unit (CPU) used to control the display card to enter power saving mode through the power management module when the predetermined conditions are met, make the GPU in a non-power-supply status and the display memory in a power-supply status.

11 Claims, 3 Drawing Sheets

(56) References Cited

U.S. PATENT DOCUMENTS

| | | | |
|---|---|---|---|
| 8,233,000 B1* | 7/2012 | Diard | 345/502 |
| 2004/0196244 A1* | 10/2004 | Lin | 345/98 |
| 2007/0152993 A1* | 7/2007 | Mesmer et al. | 345/211 |
| 2008/0168285 A1* | 7/2008 | de Cesare et al. | 713/320 |

FOREIGN PATENT DOCUMENTS

| | | |
|---|---|---|
| CN | 1801265 A | 7/2006 |
| CN | 201298243 Y | 8/2009 |
| CN | 101539846 A | 9/2009 |
| CN | 101571743 A | 11/2009 |

* cited by examiner

COMPUTER, MONITOR AND COMPUTER DISPLAY METHOD

BACKGROUND

The present invention relates to computer field, and in particularly to a computer, a monitor and a computer display method.

BACKGROUND

People often use portable computers in case of conference, speech, teaching and the like. In these situations, a document, such as a PPT document, is often opened and one of pages therein is displayed to be discussed and explained for several minutes or even more than ten minutes. Based on such application situation, the inventor of the present invention finds much power consumed with the display method of the prior art, because the computer operates only for displaying one page of the PPT during a long period of time, which is very wasteful in view of energy saving.

SUMMARY

The embodiments of the present invention provides a computer, a monitor and a computer display method, in order to solve the technical problem that the power consumption is high in case of displaying content of one page in a document for a long time in the prior art.

In order to realize the above-described object, an aspect of the present invention provides a computer, comprising:

a graphic card with a graphic processing unit and a display memory, which is configured to receive data to be displayed, process the data, and output the processed data for displaying on a display;

a power management module, which is configured to manage power supply states of the graphic processer and the display memory;

a central processing unit, which is configured to control the graphic card to enter a power-saving mode through the power management module, so that the graphic processing unit is in a non-power-supply state and the display memory is in a power-supply state, when predetermined conditions are satisfied.

Optionally, in the computer, the central processing unit enters the power-saving mode after the display memory enters the power-saving mode.

In another aspect there is provided a computer, comprising: a host and a display, wherein, the host comprises:

a graphic card with a display memory, which is configured to receive data to be displayed, process the data, store the processed data into the display memory and output the same to the display from the display memory when there is a need to be displayed, for displaying on the display; and a central processing unit, which is configured to output the data stored in the display memory to a buffer in the display and control the graphic card to enter a power-saving mode, when predetermined conditions are satisfied;

the display comprises:

the buffer, which is configured to save the data output from the host when the predetermined conditions are satisfied; and a display screen, which is configured to display the data saved in the buffer after the graphic card enters the power-saving mode.

Optionally, in the computer, the display further comprises:

a converting module, which is configured to convert the data saved in the buffer into data signals which are supported by the display, for displaying on the display.

Optionally, in the computer, the central processing unit makes the graphic card to be in the power-saving mode by interrupting the power supply of the graphic card.

In another aspect of the present invention, there is provided a display connected with a host having a graphic card, the display comprises:

a buffer, which is configured to save data to be displayed of the host which is obtained from a display memory in the graphic card when the host satisfies predetermined conditions; and a display screen, which is configured to display the data saved in the buffer.

Optionally, the display further comprises:

a converting module, which is configured to convert the data saved in the buffer into data signals which are supported by the display, and the display screen is further configured to display the converted data signals.

In another aspect, the display is provided wherein the data saved in the buffer is the data to be displayed which is obtained from the display memory in the graphic card before the graphic card enters the power-saving mode.

In another aspect of the present invention, there is provided a display method of a computer including a host and a display, wherein the computer comprises a graphic card with a graphic processing unit and a display memory, a power management module and a central processing unit, the display method comprises steps:

controlling, by the central processing unit, the graphic card to enter a power-saving mode through the power management module, so that the graphic processing unit is in a non-power-supply state and the display memory is in a power-supply state, when predetermined conditions are satisfied.

In another aspect of the present invention, there is provided a display method of a computer including a host and a display, the host including a graphic card with a display memory and a central processing unit, wherein the display including a buffer and a display screen, the display method comprises steps:

outputting data stored in the display memory to the buffer in the display and controlling the graphic card to enter a power-saving mode, when predetermined conditions are satisfied; and displaying, by the display, the data saved in the buffer on the display screen.

In another aspect the display method is provided wherein, before the display displays the data saved in the buffer on the display screen, it further comprises a step of:

converting the data saved in the buffer into display data which is supported by the display.

One of the above-described technical solutions has following technical effects.

When the predetermined conditions are satisfied, the CPU controls the graphic card to enter the power-saving mode through the power management module, so that the graphic processing unit is in the non-power-supply state and the display memory is in the power-supply state. Thus, power supply states of the graphic processing unit and the display memory in the graphic card are controlled, respectively, therefore the display memory is still in the power-supply state so as to save the image data of a page currently displayed and hold the page currently displayed through the display, even when the graphic processing unit is in the non-power-supply state.

Further, the technical solution in the embodiment of the present invention may reduce the power consumption in the case of only displaying the same page for a long time, because the graphic card enters the power-saving mode.

Another technical solution described above has the following technical effects.

By disposing the buffer in the display, the buffer is used to save the data of the display memory in the graphic card and the graphic card is in the power-saving mode when the predetermined conditions are satisfied, the display may hold the picture currently displayed with the data saved in the buffer. Since the graphic card is in the power-saving mode, the technical solution in the embodiment of the present invention may display the same page for a long time with low power consumption, which may greatly reduce the power consumption in case of displaying the same page for a long time.

DETAILED DESCRIPTION

Figure 1:
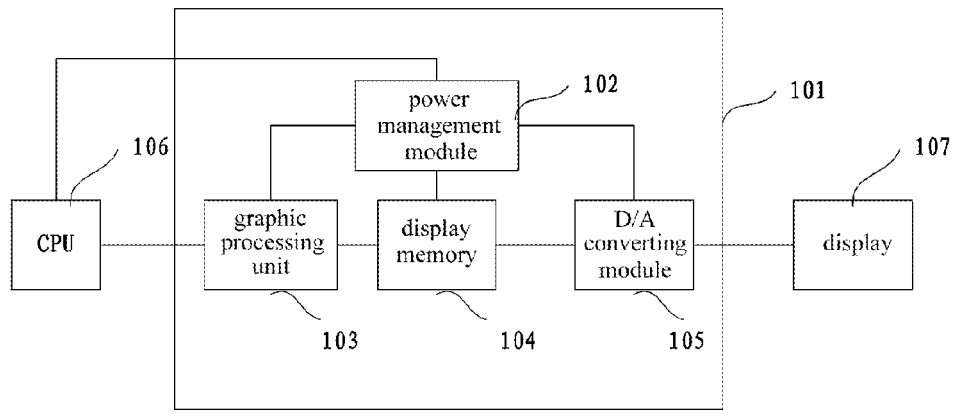
FIG. 1 is a schematic structural view of a computer of an embodiment of the present invention.

The technical problem to be solved, technical solution and advantages of the embodiment of the present invention will become more apparent from the following detailed description in connection with the drawings and special embodiments.

A computer according to an embodiment of the present invention comprises: a graphic card with a graphic processing unit and a display memory, which is configured to receive data to be displayed, process the data, and output the processed data for displaying on a display; a power management module, which is configured to manage power supply states of the graphic processer and the display memory; and a central processing unit, which is configured to control the graphic card to enter a power-saving mode through the power management module, so that the graphic processing unit is in a non-power-supply state and the display memory is in a power-supply state, when predetermined conditions are satisfied.

In the computer according to the embodiment of the present invention, power supply states of the graphic processing unit and the display memory of the graphic card are controlled, respectively, therefore the display memory is still in the power-supply state so as to save the image data of a page currently displayed and hold the page currently displayed through the display, even when the graphic processing unit is in the non-power-supply state. Further, the computer according to the embodiment of the present invention may reduce the power consumption in the case of only displaying the same page for a long time, because the graphic card enters the power-saving mode.

Exemplarily, the above-described power management module may be disposed on the graphic card as a part of the graphic card, or may be disposed outside the graphic card, such as be disposed in an embedded controller.

Optionally, in the computer, the central processing unit is further configured to control other components than the graphic card in the computer to enter the power-saving mode, after the graphic card enters the power-saving mode. Optionally, the central processing unit CPU itself also enters the power-saving mode after the graphic card enters the power-saving mode. Exemplarily, the embodiment of the present invention enters the power-saving mode in accordance with the ACPI specification.

Optionally, the above-described predetermined conditions comprise at least one of receiving a trigger instruction issued from a user and detecting that a display duration of the page currently displayed exceeds a predetermined first duration. The predetermined first duration may be preset by the user as needed, or may be a default duration of the computer.

Exemplarily, the trigger instruction issued from the user may be implemented through a hot key. The hot key may be implemented as a hard key or a soft key. When the CPU receives the instruction issued from the user by pressing the hot key, it controls the graphic card to enter the power-saving mode through the power management module, so that the graphic processing unit is in the non-power-supply state while the display memory is in the power-supply state.

In the embodiment of the present invention, the display may be an analog signal display, such as a VGA, or a digital signal display, such as a liquid crystal display with a Digital Visual Interface (DVI) or a High Definition Multimedia Interface (HDMI). Exemplarily, when the display is the analog signal display, the graphic card comprises a Digital/Analog converting module which is configured to convert the image signals output from the display memory into analog signals and in turn output the same to the display for displaying. When the display is the digital signal display, the graphic card comprises a D/D converting module which is configured to convert the image signals output from the display memory into a signal format supported by the display and in turn output the same to the display for displaying.

FIG. 1 is a schematic view illustrating a structure of the computer of another embodiment of the present invention. As illustrated in FIG. 1, in this embodiment, the graphic card 101 comprises: a power management module 102, a graphic processing unit (GPU) 103, a display memory 104 and a Digital/Analog (D/A) converting module 105; the power management module 102 may control power supplies of the graphic processing unit, the display memory and the D/A converting module separately according to instructions from a CPU 106. In the display method of the embodiment of the present invention, when a predetermined condition is satisfied, exemplarily when the user presses a hot key for entering the power-saving mode, the CPU manages the graphic card so as to inform the power management module in the graphic card of setting the graphic card into the power-saving mode, so that the graphic processing unit is in the non-power-supply state while the display memory and the D/A converting module are in the power-supply state.

In other embodiments of the present invention, when the CPU detects that the user is in an application mode of displaying a same page for a long time, exemplarily when the CPU detects that the display duration of the page currently displayed exceeds a predetermined first duration, it may also inform the power management module in the graphic card of setting the graphic card into the power-saving mode, so that the graphic processing unit is in the non-power-supply state while the display memory and the D/A converting module are in the power-supply state.

Thus, because the display memory and the D/A converting module are still in an operation state even when the graphic processing unit does not operate, the graphic card will hold the currently saved data, convert it into the analog signals supported by the display through the D/A converting module and output to the display regularly for displaying, so that a page corresponding to the data in the display memory could be displayed on the display for a long time and power consumption thereof is comparatively lower, when the GPU does not operate, even when the CPU and other components in the computer are in the power-saving mode.

Exemplarily, in this example, the CPU make all of other components in the computer system than the display memory, the D/A converting module and the display to enter the power-saving mode, after the graphic processing unit enters the power-saving mode.

The CPU and the graphic processing unit in the power-saving mode may be woken up when predetermined wake-up conditions are satisfied, exemplarily by pressing the above-described hot key again to wake up the CPU and the graphic card in the power-saving mode. In particular, the CPU may return to a normal operation mode and supply the power to the GPU through the power management module, when the predetermined wake-up conditions are satisfied.

Figure 2:
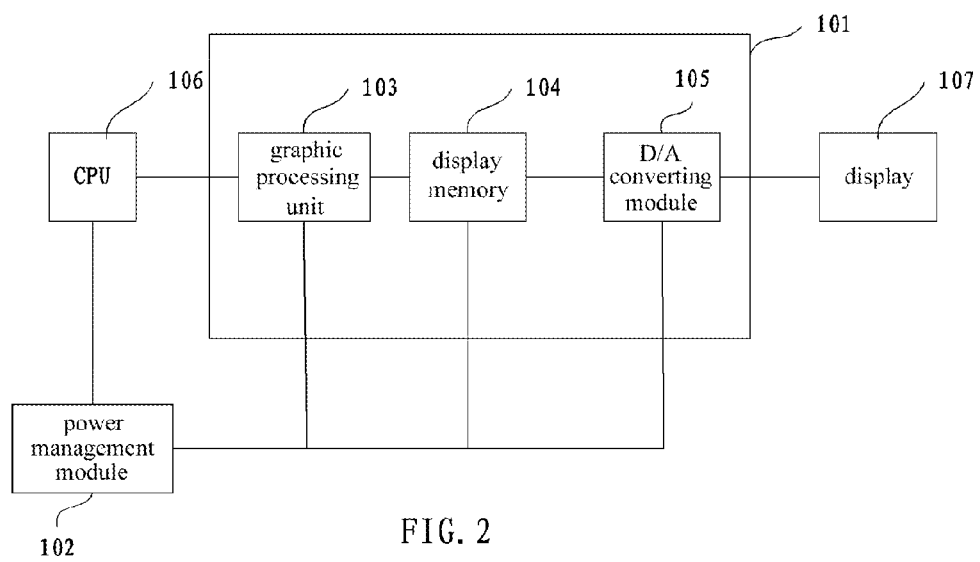
FIG. 2 is a schematic structural view of a computer of another embodiment of the present invention.

In this example, the power management module is disposed on the graphic card. In other embodiments of the present invention, the power management module may be disposed outside the graphic card instead of in the graphic card, as illustrated in FIG. 2.

Figure 3:
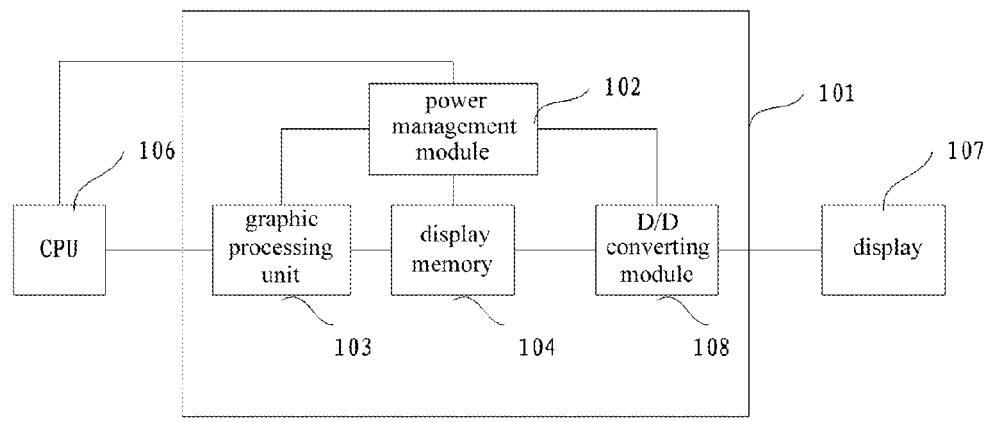
FIG. 3 is a schematic structural view of a computer of a still embodiment of the present invention.

FIG. 3 is a schematic view illustrating a structure of the computer of a still embodiment of the present invention. In this example, the display is a digital display supporting the digital signals. As illustrated in FIG. 3, the D/A converting module 105 is replaced with a D/D converting module 108 for a case where the display is the digital signal display. When both of the graphic processing unit and the CPU are in the power-saving mode, the display memory still holds the image data of the page being displayed currently therein and transmits the image data to the D/D converting module regularly, which is in turn transmitted to the display for displaying after being converted into the display signal format, such as DVI or HDMI format, supported by the display. Also, the power management module is not limited to be disposed on the graphic card, and its details are omitted.

Figure 4:
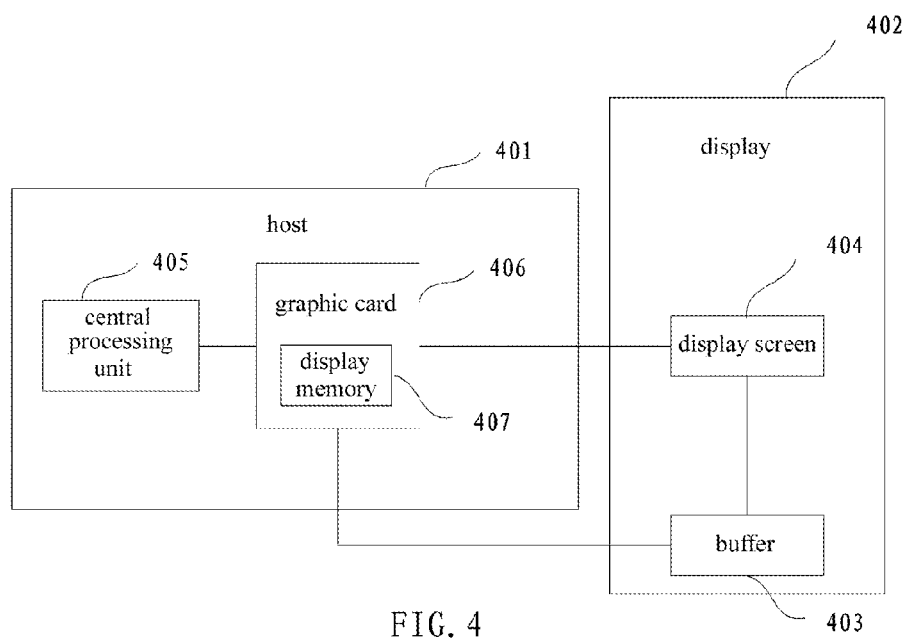
FIG. 4 is a schematic structural view of a computer of a further embodiment of the present invention.

FIG. 4 is a schematic view illustrating a structure of the computer of a further embodiment of the present invention. As illustrated in FIG. 4, a computer according to this embodiment comprises: a host 401 and a display 402, the host comprises: a graphic card 406 with a display memory 407, which is configured to receive data to be displayed, process the data, store the processed data into the display memory and output the same to the display from the display memory when there is a need to be displayed, for displaying on the display; and a central processing unit 405, which is configured to output the data stored in the display memory to a buffer in the display and control the graphic card to enter a power-saving mode, when predetermined conditions are satisfied; the display 402 comprises: the buffer 403, which is configured to save the data output from the host when the predetermined conditions are satisfied; and a display screen 404, which is configured to display the data saved in the buffer after the graphic card enters the power-saving mode.

Optionally, in other embodiment of the present invention, the display may also acquire the data from the display memory actively when the host satisfies the predetermined conditions.

Optionally, the above-described predetermined conditions comprise at least one of receiving a trigger instruction issued from a user and detecting that a display duration of a page currently displayed exceeds a predetermined first duration. Optionally, in the computer according to this embodiment, besides the graphic card, other components in the host, including the CPU, may enter the power-saving mode, and the display may remain the display of the page by displaying the data in the buffer, which can greatly reduce the power consumption.

Optionally, in the computer according to this embodiment, a converting module (a first converting module) is further disposed in the graphic card, which is configured to convert the data in the display memory into the data signals supported by the display.

Optionally, in the computer according to this embodiment, a converting module (a second converting module) is further disposed in the display, which is configured to convert the data in the buffer into the data signals supported by the display.

Figure 5:
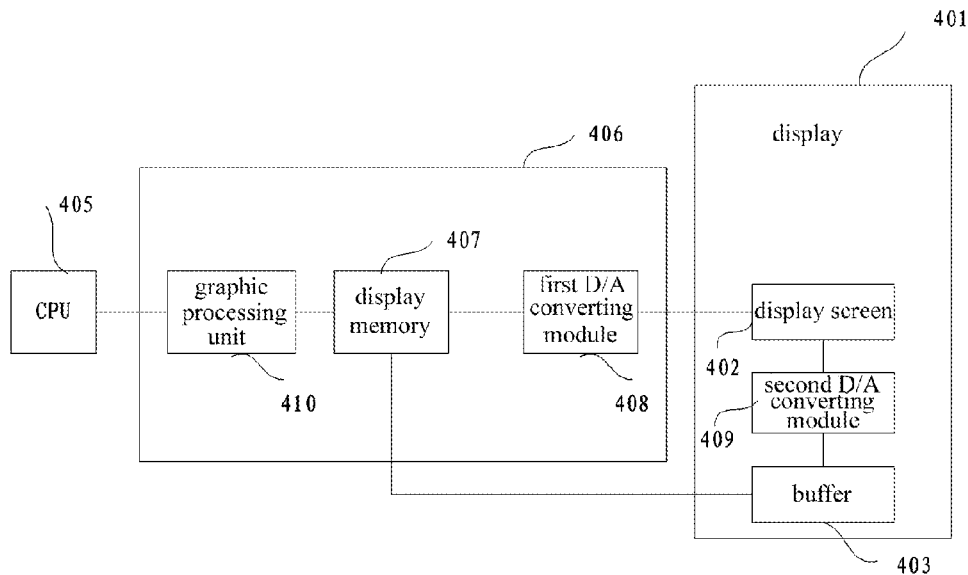
FIG. 5 is a schematic structural view of a computer of a further embodiment of the present invention.

In the embodiment of the present invention, the display may be an analog signal display, such as a VGA, or a digital signal display, such as a liquid crystal display with a Digital Visual Interface (DVI) or a High Definition Multimedia Interface (HDMI). FIG. 5 is a schematic view illustrating a structure of the computer of a further embodiment of the present invention. In this example, the display is the analog display supporting the analog signals. As illustrated in FIG. 5, when the display is the analog signal display, the graphic card comprises a Digital/Analog converting module (a first D/A converting module) 408 which is configured to convert the image signals output from the display memory into analog signals and in turn output the same to the display for displaying. The display further comprises a D/A converting module (a second D/A converting module) 409 as the converting module, which is configured to convert the data in the buffer into the analog signals and display the same on the display screen, when the data to be displayed in the buffer is needed to be displayed. In this example, the graphic card further comprises a graphic processing unit 410 which is configured to output the data to the display memory in its normal operation mode. Exemplarily, in the computer according to this embodiment of the present invention, the central processing unit makes the graphic card to enter the power-saving mode by interrupting the power supply for the graphic card. In a detailed implementation, the central processing unit may interrupt the power supply for the graphic card by controlling the power management module. In this example, the power supplies of respective modules in the graphic card (including the graphic processing unit, the display memory and the first D/A converting module) are interrupted.

Figure 6:
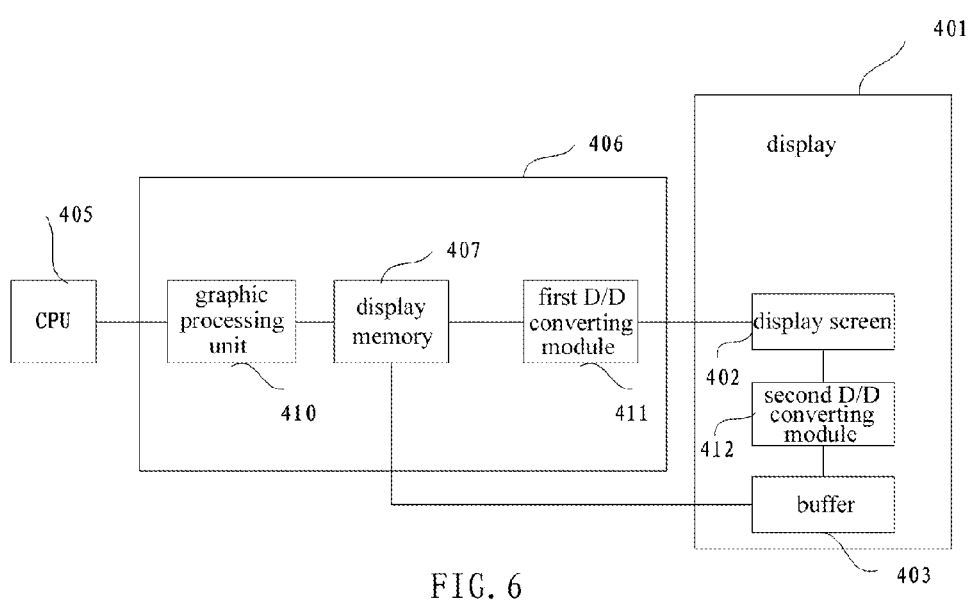
FIG. 6 is a schematic structural view of a computer of a further embodiment of the present invention.

FIG. 6 is a schematic view illustrating a structure of the computer of a further embodiment of the present invention. In this example, the display is a digital display supporting the digital signals. As illustrated in FIG. 6, when the display is the digital signal display, the graphic card comprises a D/D converting module (the first D/D converting module) 411 which is configured to convert the image signals output from the display memory into a signal format supported by the display and in turn output the same to the display for displaying. The display further comprises a D/D converting module (a second D/D converting module) 412 as the converting module, which is configured to convert the data in the buffer into the digital signal format into a signal format supported by the display and display the same on the display screen, when the data in the buffer is needed to be displayed. In this example, the graphic card further comprises a graphic processing unit 410 which is configured to output the data to the display memory in its normal operation mode. Exemplarily, the graphic processing unit is a graphic processing chip.

In the computer according to the embodiment of the present invention, by disposing the buffer in the display, the data output from the display memory in the graphic card is saved with the buffer, and the graphic card is controlled to be in the power-saving mode after the data is output to the buffer of the display, when the predetermined conditions are satisfied (receiving the trigger instruction issued from a user; or detecting that a display duration of a page currently displayed exceeds the predetermined first duration). Exemplarily, the trigger instruction may be issued when the user presses a preset hot key including a hard key or a soft key. Exemplarily, the entire graphic card is in the non-power-supply state during the power-saving mode. The central processing unit may make the graphic card to be in the power-saving mode by interrupting its power supply. Thus, the display may still hold the picture currently displayed with the data saved in the buffer even after the graphic card enters the power-saving mode. Since the graphic card is in the power-saving mode, the technical solution in the embodiment of the present invention may display the same page for a long time with low power consumption, which may greatly reduce the power consumption in case of displaying the same page for a long time.

The embodiment of the present invention may be achieved by setting a buffer region in the display, inputting image data currently saved in the display memory to the buffer region for storing before the computer system (except the display) enters the power-saving mode, and displaying the image data storing in the buffer region after the computer system (except the display) enters the power-saving mode.

Optionally, all of other components in the computer except the display may enter the power-saving mode, after the data in the display memory is output to the buffer of the display.

Optionally, the CPU and the graphic processing unit in the power-saving mode are woken up when predetermined wake-up conditions are satisfied, exemplarily by pressing the above-described hot key again to wake up the CPU and the graphic card in the power-saving mode. In particularly, the CPU may return a normal operation mode and supply the power to the GPU through the power management module, when the predetermined wake-up conditions are satisfied.

Exemplarily but not restrictively, when the graphic card is in the normal mode, the data output to the display for displaying is in a format which has been converted by the converting module and can be displayed directly by the display; when the graphic card is in the power-saving mode in the embodiment, the data output to the buffer is in a format which has not been converted by the converting module, therefore the data is needed to be converted by the converting module in the display so as to be displayed, after it is output to the buffer in the display. In the embodiment of the present invention, the CPU outputs the data in the display memory to the display memory in the display via a preset data interface. Exemplarily, the preset data interface is an I$^2$C interface. The preset data interface is different from that is used for outputting the data to the display by the display memory when the graphic card is in the normal operation mode.

The embodiment of the present invention further provides a display connected with a host having a graphic card, the display comprises: a buffer, which is configured to save data of the host which is obtained from a display memory in the graphic card when the host satisfies predetermined conditions; and a display screen, which is configured to display the data saved in the buffer.

Exemplarily, the data saved in the buffer may be output to the buffer from the display memory by the CPU of the host, or may be taken out from the display memory and stored in the buffer by the display, when the predetermined conditions are satisfied.

Optionally, the display further comprises: a converting module, which is configured to convert the data saved in the buffer into data signals which are supported by the display; and the display screen is further configured to display the converted data signals. Exemplarily, the converting module may be a D/A converting module or a D/D converting module depending on the type of the display.

Optionally, the data saved in the buffer is the data which is obtained from the display memory in the graphic card before the graphic card enters the power-saving mode.

Optionally, the above-described predetermined conditions is at least one of receiving a trigger instruction issued from a user and detecting that a display duration of a page currently displayed exceeds a predetermined first duration.

The embodiment of the present invention further provides a display method of a computer including a host and a display, wherein the computer comprises a graphic card with a graphic processing unit and a display memory, a power management module and a central processing unit, the display method comprises steps:

controlling the graphic card to enter a power-saving mode through the power management module by the central processing unit, so that the graphic processing unit is in a non-power-supply state and the display memory is in a power-supply state, when predetermined conditions are satisfied.

The display method according to the embodiment of the present invention further comprises a step of waking up the graphic card in the power-saving mode when predetermined wake-up conditions are satisfied.

The display method according to the embodiment of the present invention further comprises a step of, after the graphic card enters the power-saving mode, a CPU and/or other components in the computer except the graphic card entering the power-saving mode.

Optionally, the above-described predetermined conditions is at least one of receiving a trigger instruction issued from a user and detecting that a display duration of a page currently displayed exceeds a predetermined first duration.

In a further display method of a computer according to the embodiment of the present invention, the computer comprises a host and a display, the host comprises a graphic card with a display memory and a central processing unit, wherein the display comprises a buffer and a display screen, the display method comprises steps:

outputting the data stored in the display memory to the buffer in the display and controlling the graphic card to enter a power-saving mode, when predetermined conditions are satisfied; and displaying, by the display, the data saved in the buffer on the display screen.

Optionally, the display method according to the embodiment of the present invention further comprises a step of, before the display displays the data saved in the buffer on the display screen, converting the data saved in the buffer into display data which is supported by the display.

Optionally, the data saved in the buffer of the display is data output directly from the display memory. Exemplarily, when the display is an analog display, the display method further comprises a step of, before the display displays the data to be displayed saved in the buffer on the display screen, converting the data to be displayed saved in the buffer into analog data which is supported by the display; when the display is an digital display, the display method further comprises a step of, before the display displays the data to be displayed saved in the buffer on the display screen, converting the data to be displayed saved in the buffer into a digital signal format which is supported by the display.

Optionally, the display reads out data from the buffer and converts the data to display it when it judges that no display signal which is sent from the graphic card through the normal manner is received. Exemplarily, the display reads out data from the buffer and converts the data to display it, when it judges that no signals which could be displayed directly and output from the display memory are received.

The display method according to the embodiment of the present invention further comprises a step of, after the graphic card enters the power-saving mode, a CPU and/or other components in the computer except the graphic card entering the power-saving mode.

The display method according to the embodiment of the present invention further comprises a step of waking up the graphic card in the power-saving mode when predetermined wake-up conditions are satisfied.

Optionally, the above-described predetermined conditions is at least one of receiving a trigger instruction issued from a user and detecting that a display duration of a page currently displayed exceeds a predetermined first duration.

With the display method according to the embodiment of the present invention, the power consumption may be greatly reduced in a situation where a document, such as a PPT document, is open and one of pages therein is displayed to be discussed and explained for a long time.

The above are preferable embodiments of the present invention, and it is to be noted that various changes and modifications may be made in these embodiments without departing from the spirit and scope of the embodiment of the present invention. Therefore, all of such changes and modifications will fall into the scope of the present invention.

What is claimed is:

1. A computer, comprising:
   a graphic card with a graphic processing unit and a display memory, which is configured to receive data to be displayed, process the data, and output the processed data for displaying on a display;
   a power management module, which is configured to manage power supply states of the graphic processer and the display memory; and
   a central processing unit, which is configured to control the graphic card to enter a power-saving mode through the power management module, so that the graphic processing unit is in a non-power-supply state and the display memory is in a power-supply state, when predetermined conditions are satisfied and wherein, in the power-saving mode, the display memory outputs the data for displaying through a different interface to the display.

2. The computer as claimed in claim 1, wherein the central processing unit enters the power-saving mode after the display memory enters the power-saving mode.

3. A computer, comprising: a host and a display, wherein, the host comprises:
   a graphic card with a display memory, which is configured to receive data to be displayed, process the data, store the processed data into the display memory and output the same to the display from the display memory when there is a need to be displayed, for displaying on the display; and
   a central processing unit, which is configured to output the data stored in the display memory to a buffer in the display and control the graphic card to enter a power-saving mode, when predetermined conditions are satisfied;
   the display comprises:
   the buffer, which is configured to save the data output from the host when the predetermined conditions are satisfied; and
   a display screen, which is configured to display the data saved in the buffer after the graphic card enters the power-saving mode, and wherein, in the power-saving mode, the display memory outputs the data for displaying through a different interface to the buffer.

4. The computer as claimed in claim 3, wherein the display further comprises: a converting module, which is configured to convert the data saved in the buffer into data signals which are supported by the display, for displaying on the display.

5. The computer as claimed in claim 3, wherein, the central processing unit makes the graphic card to be in the power-saving mode by interrupting the power supply of the graphic card.

6. A display connected with a host having a graphic card, comprising:
   a buffer, which is configured to save data to be displayed of the host which is obtained from a display memory in the graphic card when the host satisfies predetermined conditions; and
   a display screen, which is configured to display the data saved in the buffer, and wherein, in a power-saving mode, the buffer receives the data to be displayed through a different interface from the display memory.

7. The display as claimed in claim 6, further comprising:
   a converting module, which is configured to convert the data save in the buffer into data signals which are supported by the display,
   and the display screen is further configured to display the converted data signals.

8. The display as claimed in claim 6, wherein the data saved in the buffer is the data obtained from the display memory in the graphic card before the graphic card enters the power-saving mode.

9. A display method of a computer including a host and a display, wherein the computer comprises a graphic card with a graphic processing unit and a display memory, a power management module and a central processing unit, the display method comprises steps:
   controlling, by the central processing unit, the graphic card to enter a power-saving mode through the power management module, so that the graphic processing unit is in a non-power-supply state and the display memory is in a power-supply state, when predetermined conditions are satisfied, and wherein, in the power-saving mode, the display memory outputs the data for displaying through a different interface to the display.

10. A display method of a computer including a host and a display, wherein the host comprises a graphic card with a display memory and a central processing unit, the display comprises a buffer and a display screen, the display method comprises steps:
    outputting the data to be displayed stored in the display memory to the buffer in the display and controlling the graphic card to enter a power-saving mode, when predetermined conditions are satisfied; and
    displaying, by the display, the data saved in the buffer on the display screen.

11. The display method as claimed in claim 10, further comprising a step of: converting the data saved in the buffer into display data which is supported by the display, before the display displays the data saved in the buffer on the display screen.

* * * * *